United States Patent
Naito et al.

(10) Patent No.: US 11,900,802 B2
(45) Date of Patent: Feb. 13, 2024

(54) COUNTING DEVICE, COUNTING METHOD, AND COUNTING PROGRAM

(71) Applicant: NIPPON TELEGRAPH AND TELEPHONE CORPORATION, Tokyo (JP)

(72) Inventors: Ichibe Naito, Musashino (JP); Nobuhiro Oki, Musashino (JP); Naoko Shigematsu, Musashino (JP); Isoo Ueno, Musashino (JP); Atsushi Isomura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 17/908,540

(22) PCT Filed: Mar. 6, 2020

(86) PCT No.: PCT/JP2020/009877
§ 371 (c)(1),
(2) Date: Sep. 1, 2022

(87) PCT Pub. No.: WO2021/176733
PCT Pub. Date: Sep. 10, 2021

(65) Prior Publication Data
US 2023/0162598 A1    May 25, 2023

(51) Int. Cl.
*G08G 1/065* (2006.01)
*G08G 1/017* (2006.01)

(52) U.S. Cl.
CPC .............. *G08G 1/065* (2013.01); *G08G 1/017* (2013.01)

(58) Field of Classification Search
CPC .............................. G08G 1/065; G08G 1/017
See application file for complete search history.

(56) References Cited

U.S. PATENT DOCUMENTS 11,005,720 B2 *  5/2021  Ricci ................... G06F 11/3065
11,049,391 B2 *  6/2021  Mintz .................. G08G 1/0145
(Continued)

FOREIGN PATENT DOCUMENTS

WO       2020/045323 A1     3/2020

OTHER PUBLICATIONS

Aji et al., "Hadoop-GIS: A High Performance Spatial Data Warehousing System over MapReduce", Proceedings of the VLDB Endowment, vol. 6, No. 11, Available Online At: http://www.vldb.org/pvldb/vol6/p1009-aji.pdf, Aug. 26-30, 2013, pp. 1009-1020.

*Primary Examiner* — Mohamed Barakat
(74) *Attorney, Agent, or Firm* — XSENSUS LLP (57) ABSTRACT

A counting device includes processing circuitry configured to store rectangular area definition information indicating positions and sizes of rectangular areas obtained by dividing an area where a number of mobile devices is counted, count the number of mobile devices present in each of the rectangular areas indicated in the rectangular area definition information, every predetermined time, based on position information of each of the mobile devices, and when it is determined based on a counting result of the number of mobile devices present in each of the rectangular areas that there are rectangular areas where the number of mobile devices is smaller than a first threshold, integrate the rectangular areas to generate a new rectangular area, when it is determined based on the counting result that there is a rectangular area where the number of mobile devices exceeds a second threshold, divide the rectangular area to generate new rectangular areas.

7 Claims, 7 Drawing Sheets

(56) References Cited

U.S. PATENT DOCUMENTS

| | | | | |
|---|---|---|---|---|
| 2012/0307645 | A1* | 12/2012 | Grosman | H04W 4/021 |
| | | | | 370/241 |
| 2013/0165142 | A1* | 6/2013 | Huang | G01S 5/02524 |
| | | | | 455/456.1 |
| 2016/0351162 | A1* | 12/2016 | Miura | G06T 3/40 |
| 2017/0032666 | A1* | 2/2017 | Pretorius | G08G 1/0116 |
| 2020/0342765 | A1* | 10/2020 | Fukumori | G08G 1/0112 |
| 2021/0199463 | A1 | 7/2021 | Kitahara et al. | |

\* cited by examiner

TOTAL NUMBER OF VEHICLES: 80
AVERAGE: 5

COUNTING DEVICE, COUNTING METHOD, AND COUNTING PROGRAM

CROSS-REFERENCE TO RELATED APPLICATION

The present application is based on PCT filing PCT/JP2020/009877, filed Mar. 6, 2020, the entire contents of which are incorporated herein by reference.

TECHNICAL FIELD

The present invention relates to a counting device, a counting method, and a counting program.

BACKGROUND ART

In order to grasp the congestion condition of a moving body such as a vehicle, there is a technology for collecting the position information of the moving body every predetermined time, and counting the number of vehicles or the like present in areas (rectangular areas) obtained by dividing areas on a map into rectangles, on the basis of the collected position information of the moving body (see Non-Patent Document 1).

CITATION LIST

Non Patent Literature

NPL 1: Hadoop-GIS A High Performance Spatial Data Warehousing System over MapReduce, [Search on Mar. 2, 2020], Internet <vldb.org/pvldb/vol6/p1009-aji.pdf>

SUMMARY OF THE INVENTION

Technical Problem

In the above technology, when a large area is divided into small rectangular areas and the number or the like of vehicles is counted, the number of times of counting increases. As a result, the time required for counting increases, and the update time of the counting result increases, unfortunately. Furthermore, since it is not known when and where a traffic jam or the like occurs, it is not possible to obtain detailed counting results such as the number of vehicles at the location where the traffic jam has occurred. Therefore, an object of the present invention is to solve the aforementioned difficulties, to reduce the time required for counting the number of vehicles or the like in each rectangular area, and to obtain detailed counting results such as the number of vehicles at the location where a traffic jam or the like has occurred.

Means for Solving the Problem

In order to solve the problems described above, a counting device includes: processing circuitry configured to: to store rectangular area definition information indicating positions and sizes of rectangular areas obtained by dividing an area where a number of mobile devices is counted; count the number of mobile devices present in each of the rectangular areas indicated in the rectangular area definition information, every predetermined time, based on position information of each of the mobile devices; when it is determined based on a counting result of the number of mobile devices present in each of the rectangular areas that there are rectangular areas where the number of mobile devices is smaller than a first threshold, integrate a plurality of rectangular areas included in a scope obtained by expanding a size of the rectangular area vertically and horizontally by a factor N to generate a new rectangular area, when it is determined based on the counting result that there is a rectangular area where the number of mobile devices exceeds a second threshold, divide the size of the rectangular area vertically and horizontally by a factor 1/N to generate new rectangular areas, and update the rectangular area definition information based on a position and a size of the generated new rectangular area; and out information for displaying each rectangular area on a screen by color-coding depending on the number of mobile devices existing in each rectangular area based on the counting result of the number of mobile devices existing in each rectangular area.

Effects of the Invention

According to the present invention, it is possible to reduce the time required for counting the number of vehicles or the like in each rectangular area, and to obtain detailed counting results such as the number of vehicles at the location where a traffic jam or the like has occurred.

DESCRIPTION OF EMBODIMENTS

Hereinafter, modes (embodiments) of the present invention will be described with reference to the drawings. The present invention is not limited to the embodiment described below.

Overview

First, an overview of a counting device of the present embodiment will be described with reference to FIG. 1. The counting device counts the number of mobile devices. This mobile device is, for example, a device capable of acquiring the position information of the mobile device by a global positioning system (GPS) or the like, and is, for example, a vehicle, a mobile phone, a smartphone, or the like. In the following, a case in which the mobile device is a vehicle will be described as an example.

Figure 1:
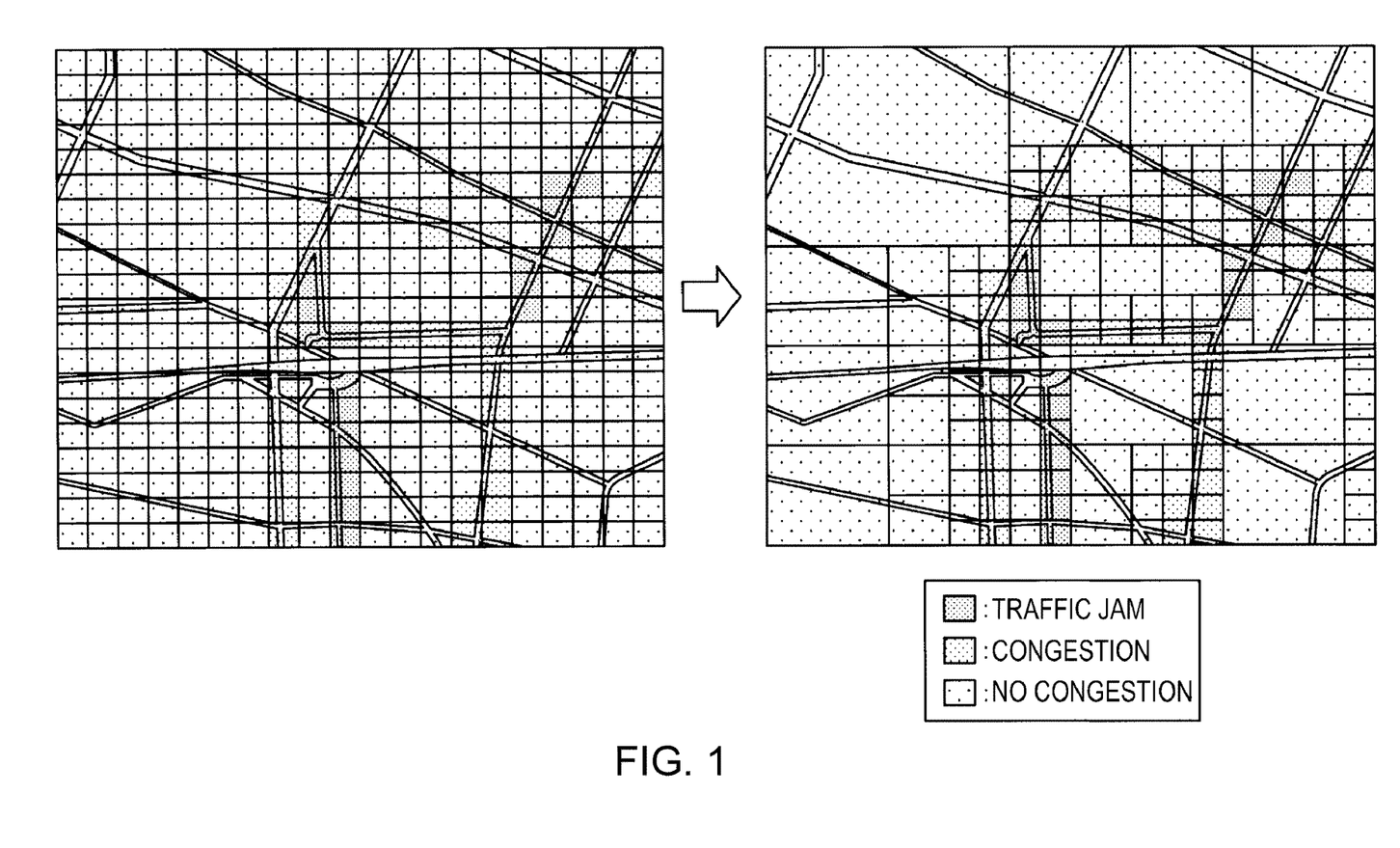
FIG. 1 is a diagram illustrating an example of a counting result of the number of vehicles present in each rectangular area.

For example, when acquiring the position information of each vehicle, the counting device first divides an area on a map into rectangular areas as illustrated in the left diagram of FIG. 1, and counts the number of vehicles present in each rectangular area. Then, the counting device redefines the sizes of the rectangular areas when counting the number of vehicles next time on the basis of a counting result of the number of vehicles present in each rectangular area.

For example, in the left diagram of FIG. 1, the counting device integrates rectangular areas, where the number of vehicles is smaller than a predetermined value, into a large rectangular area, and divides a rectangular area, where the number of vehicles is larger than the predetermined value, into small rectangular areas. For example, the counting device redefines the size of each rectangular area as illustrated in the right diagram of FIG. 1. Then, the counting device counts the number of vehicles in the entire area by using the rectangular areas whose sizes have been redefined.

In this way, the counting device integrates rectangular areas with a small number of vehicles and expands the rectangular areas, which makes it possible to reduce the time required for counting the number of vehicles in the entire area. Furthermore, the counting device divides a rectangular area with a large number of vehicles and reduces the rectangular area, which makes it possible to obtain a detailed counting result of the number of vehicles in an area where a traffic jam or the like has occurred.

Configuration Example

Figure 2:
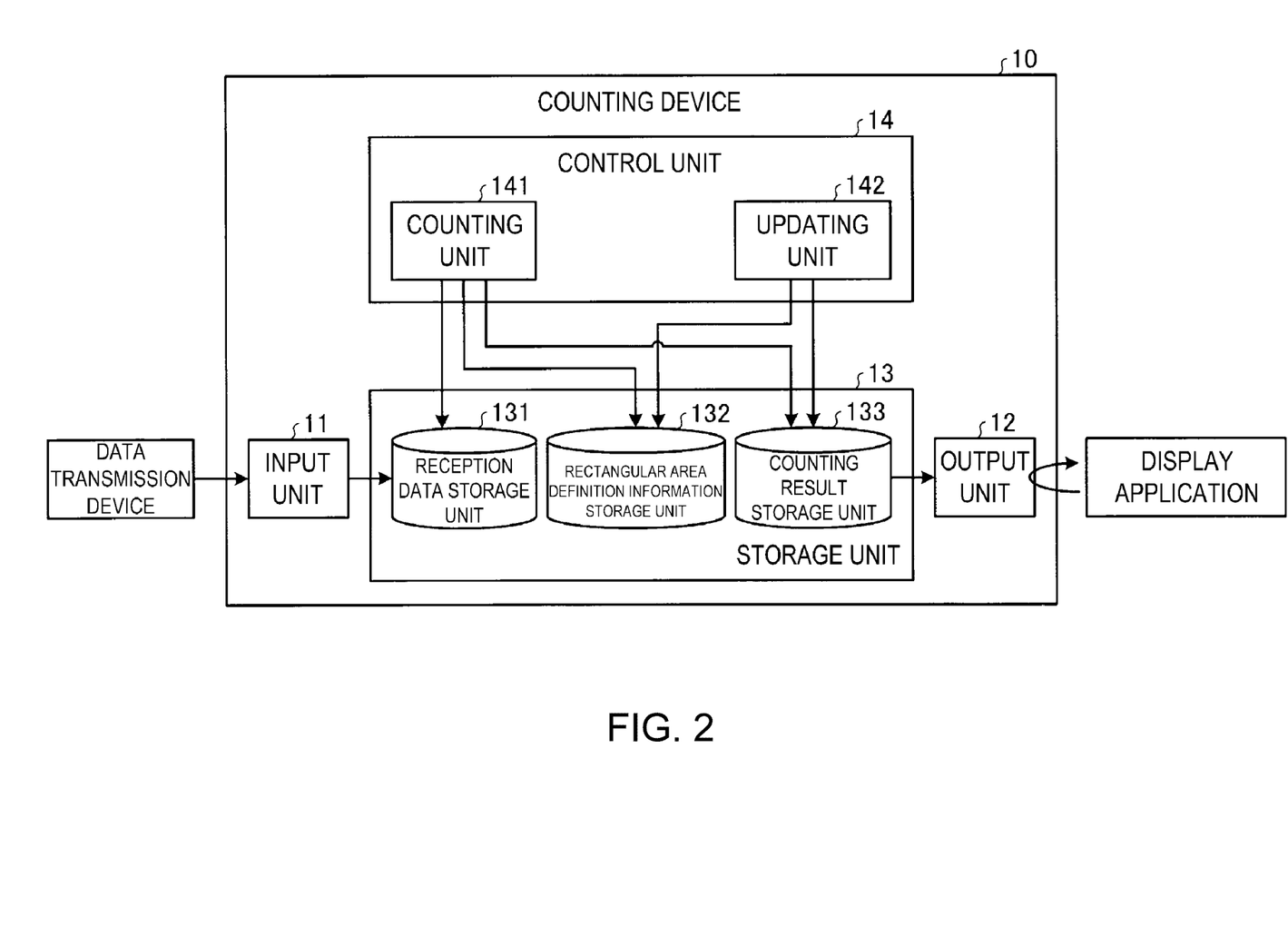
FIG. 2 is a diagram illustrating a configuration example of a counting device.

Next, a configuration example of a counting device 10 will be described with reference to FIG. 2. The counting device 10 includes an input unit 11, an output unit 12, a storage unit 13, and a control unit 14.

The input unit 11 is an interface that receives input of various data from an external device. The input unit 11 receives the position information of each vehicle from an external data transmission device, for example.

The output unit 12 is an interface that outputs various data to an external device. For example, when the access of a display application is received, the output unit 12 outputs a counting result of the number of vehicles present in each rectangular area, which is stored in a counting result storage unit 133, to the display application. Then, the display application generates and displays a screen showing the output counting result of the number of vehicles present in each rectangular area.

For example, the display application acquires the counting result of the number of vehicles present in each rectangular area, every predetermined time. Then, on the basis of the acquired counting result of the number of vehicles present in each rectangular area, the display application divides the entire area into areas with a very large number of vehicles (areas with a traffic jam), areas with a large number of vehicles (areas with congestion), and areas with few vehicles (areas without congestion) as illustrated in the right diagram of FIG. 1. The display application generates a screen showing the respective areas in different colors, and displays the screen on a display device or the like. Consequently, a user can grasp an area, where a traffic jam or congestion occurs, on the screen.

The storage unit 13 is implemented by a semiconductor memory element such as a random access memory (RAM) or a flash memory or a storage device such as a hard disk or an optical disk, and stores a processing program for operating the counting device 10, data used during the execution of the processing program, and the like.

The storage unit 13 includes, for example, a reception data storage unit 131, a rectangular area definition information storage unit 132, and the counting result storage unit 133.

The reception data storage unit 131 stores the position information of each vehicle, which is received via the input unit 11. For example, the reception data storage unit 131 stores the position information of each vehicle, which is received via the input unit 11.

The rectangular area definition information storage unit 132 stores definition information (rectangular area definition information) of rectangular areas obtained by dividing an area on a map. The rectangular area definition information is, for example, information indicating the position, size, and the like of each of the rectangular areas on the map (for example, see reference numeral 502 in FIG. 5 and reference numeral 602 in FIG. 6). The rectangular area definition information is appropriately updated by an updating unit 142 (mentioned below) to be described below. The counting result storage unit 133 stores the counting result of the number of vehicles present in each of the rectangular areas.

The control unit 14 controls the entire counting device 10. The control unit 14 has an internal memory for storing programs that define various processing procedures or the like and required data, and performs various processes using the programs and the data. For example, the control unit 14 is an electronic circuit such as a central processing unit (CPU) or a micro processing unit (MPU). The control unit 14 functions as various processing units by the execution of various programs.

The control unit 14 includes a counting unit 141 and the updating unit 142. The counting unit 141 counts the number of vehicles present in each rectangular area indicated in the rectangular area definition information, every predetermined time, on the basis of the position information of each vehicle stored in the reception data storage unit 131. The counting unit 141 stores the counting result in the counting result storage unit 133.

The updating unit 142 updates the rectangular area definition information on the basis of the counting result of the number of vehicles present in each rectangular area, which is obtained by the counting unit 141.

For example, when it is determined that there are rectangular areas where the number of vehicles is smaller than a first threshold, the updating unit 142 integrates the rectangular areas to generate a new rectangular area. Furthermore, when it is determined that there is a rectangular area where the number of vehicles is larger than a second threshold (a value larger than the first threshold), the updating unit 142 divides the rectangular area to generate new rectangular areas. Then, the updating unit 142 updates the rectangular area definition information on the basis of the position, size, or the like of the generated new rectangular area.

After the rectangular area definition information is updated, the counting unit 141 counts the number of vehicles present in each rectangular area, on the basis of the updated rectangular area definition information.

According to such a counting device 10, the time required for counting the number of vehicles in an entire area can be reduced, so the update time of the counting result of the number of vehicles can be reduced. Furthermore, according to such a counting device 10, detailed counting results such as the number of vehicles can be obtained at the location where a traffic jam or the like of vehicles has occurred.

Processing Procedure

Figure 3:
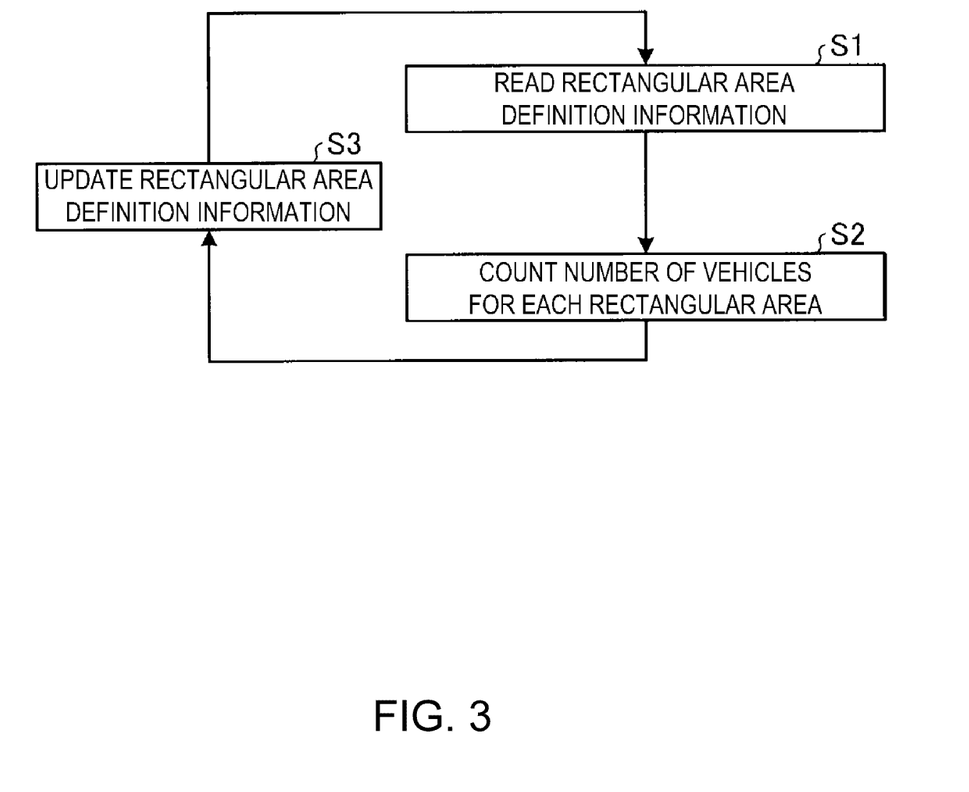
FIG. 3 is a flowchart illustrating an overview of a processing procedure of the counting device in FIG. 2.

Next, an overview of a processing procedure of the counting device 10 will be described with reference to FIG. 3. For example, first, the counting unit 141 of the counting device 10 reads the rectangular area definition information (S1). Next, the counting unit 141 counts the number of vehicles for each rectangular area indicated in the read rectangular area definition information, on the basis of position information of vehicles acquired from the reception data storage unit 131 (S2). Then, the counting unit 141 stores the counting result of the number of vehicles for each rectangular area in the counting result storage unit 133. Thereafter, the updating unit 142 updates the rectangular area definition information on the basis of the counting result of the number of vehicles for each rectangular area in S2 (S3). Thereafter, the updating unit 142 returns to the process of S1.

Figure 4:
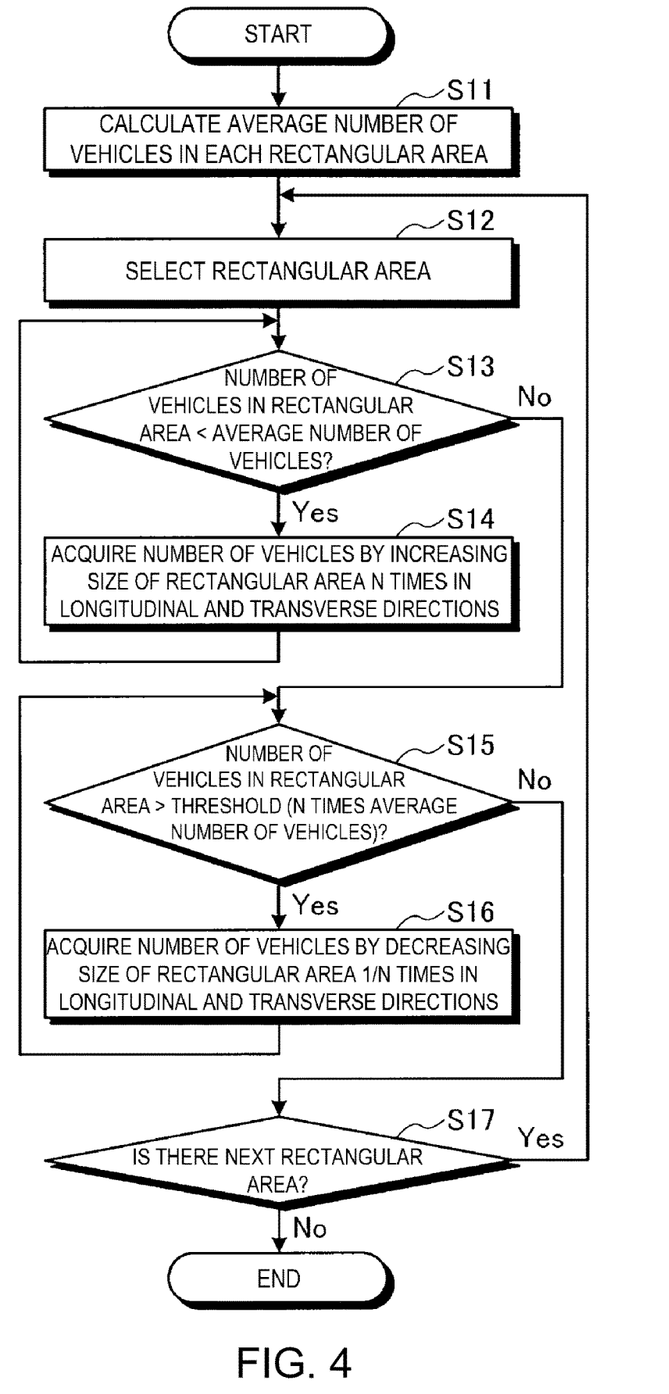
FIG. 4 is a flowchart illustrating an example of a processing procedure of an update unit in FIG. 2.

Next, an example of the processing procedure of the updating unit 142 in S3 of FIG. 3 will be described with reference to FIG. 4. In the following description, it is assumed that the updating unit 142 uses, as the first threshold, an average value of the number of vehicles present in each rectangular area.

For example, when the total number of vehicles in a counting target area is "80" and the number of rectangular areas in the counting target area is "16", an average value of the number of vehicles in each rectangular area is "5", and thus, the first threshold is "5". Furthermore, it is assumed that the update unit 142 uses N times the average value (average number of vehicles) of the number of vehicles in each rectangular area, as the second threshold (division threshold). For example, when the average value of the number of vehicles in each rectangular area is "5" and the above N is "3", the division threshold is "15".

The updating unit 142 calculates the average value of the number of vehicles in each rectangular area on the basis of the counting result of the number of vehicles present in each rectangular area, which is stored in the counting result storage unit 133 (S11). Then, when a rectangular area defined in the rectangular area definition information is selected (S12), the updating unit 142 reads the number of vehicles in the rectangular area from the counting result storage unit 133, and determines whether the number of vehicles in the rectangular area is smaller than the average number of vehicles (S13).

When it is determined in S13 that the number of vehicles in the rectangular area is smaller than the average number of vehicles (Yes in S13), the updating unit 142 acquires the number of vehicles by increasing the size of the rectangular area N times in the longitudinal and transverse directions (S14). For example, the updating unit 142 integrates a plurality of rectangular areas included in a range in which the size of the rectangular area is increased N times in the longitudinal and transverse directions. Then, the updating unit 142 acquires the number of vehicles in the integrated rectangular area from the counting result storage unit 133. Thereafter, the updating unit 142 returns to S13. On the other hand, when it is determined in S13 that the number of vehicles in the rectangular area is greater than or equal to the average number of vehicles (No in S13), the updating unit 142 proceeds to S15.

In S15, the updating unit 142 determines whether the number of vehicles in the rectangular area is larger than a threshold (division threshold or N times the average number of vehicles). When it is determined in S15 that the number of vehicles in the rectangular area is larger than the threshold (Yes in S15), the updating unit 142 acquires the vehicle number by decreasing the size of the rectangular area 1/N times in the longitudinal and transverse directions (S16). In other words, the updating unit 142 divides the rectangular area into 1/N in the longitudinal and transverse directions, and acquires the number of vehicles in each of the divided rectangular areas from the counting result storage unit 133. Thereafter, the updating unit 142 returns to S15. On the other hand, it is determined in S15 that the number of vehicles in the rectangular area is less than or equal to the threshold (No in S15), the updating unit 142 proceeds to S17. Then, when there is a next rectangular area (Yes in S17), the updating unit 142 returns to S12, and when there is no next rectangular area (No in S17), the updating unit 142 ends the procedure.

When the updating unit 142 determines the size of each rectangular area on the basis of the number of vehicles in each rectangular area as described above, the updating unit 142 updates the rectangular area definition information with the determined size of each rectangular area.

Example of Integrating Rectangular Areas

Figure 5:
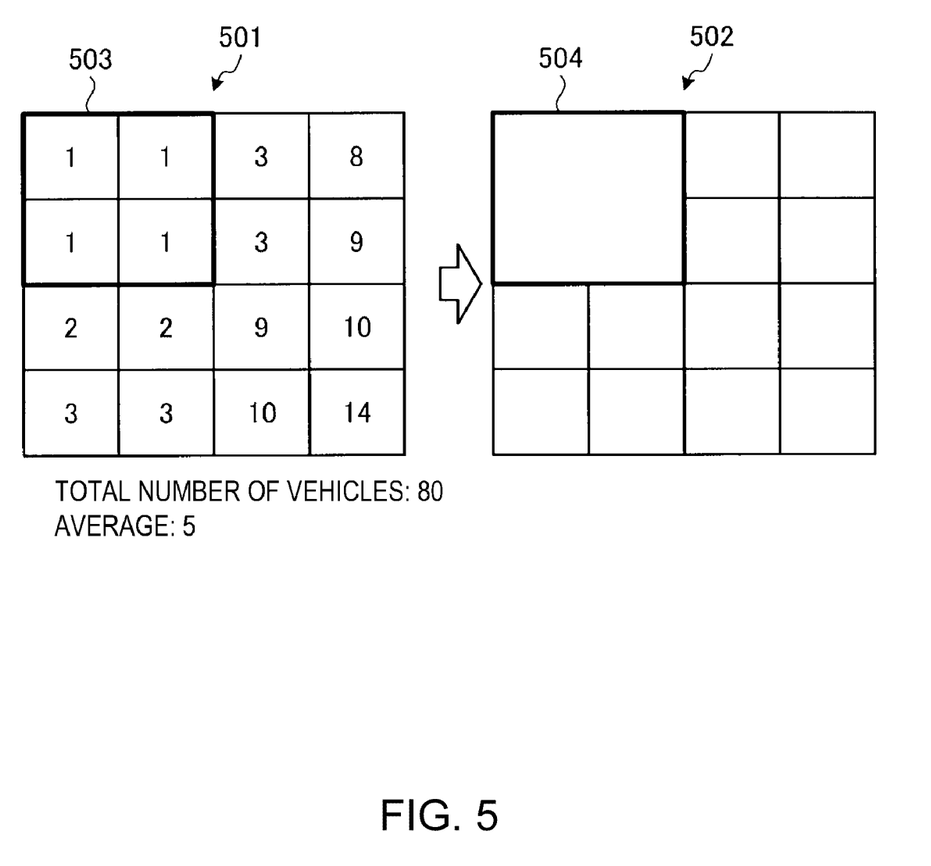
FIG. 5 is a diagram illustrating an example in which the update unit in FIG. 2 integrates rectangular areas.

Next, an example of processing when the updating unit 142 integrates a plurality of rectangular areas will be described with reference to FIG. 5. Hereafter, a case where the updating unit 142 generates rectangular area definition information indicated by reference numeral 502 on the basis of a counting result of the number of vehicles in each rectangular area indicated by reference numeral 501 will be conceived as an example. It is assumed that the updating unit 142 calculates in advance the total number "80" of vehicles in a counting target area and the average number "5" of vehicles in each rectangular range.

For example, the updating unit 142 looks at the number of vehicles in each rectangular area in order from the upper left rectangular area among the rectangular areas indicated by the reference numeral 501. When the number of vehicles in the rectangular area is smaller than the average number "5" of vehicles, the updating unit 142 doubles the size of the rectangular area in the longitudinal and transverse directions. Then, the updating unit 142 compares the number of vehicles in the rectangular area, whose size is doubled, with the average number "5" of vehicles, and doubles the size again when the number of vehicles in the rectangular area is smaller than the average number of vehicles.

For example, since the number of vehicles in the upper leftmost rectangular area among the rectangular areas indicated by reference numeral 503 is "1", the updating unit 142 doubles the size of the rectangular area in the longitudinal and transverse directions, and generates a rectangular area indicated by reference numeral 504. In other words, the updating unit 142 integrates the four rectangular areas indicated by the reference numeral 503, and generates the rectangular area indicated by the reference numeral 504. When the number of vehicles in the generated rectangular area (reference numeral 504) is smaller than the average number "5" of vehicles, the updating unit 142 doubles the size of the rectangular area again in the longitudinal and transverse directions.

By so doing, the updating unit 142 can integrate rectangular areas with a small number of vehicles to generate a new rectangular area. Note that when integrating a plurality of rectangular areas as described above, the updating unit 142 may specify the size of a maximum rectangular area, and limit the size of the integrated rectangular area to be less than the size of the maximum rectangular area.

Example of Dividing Rectangular Area

Figure 6:
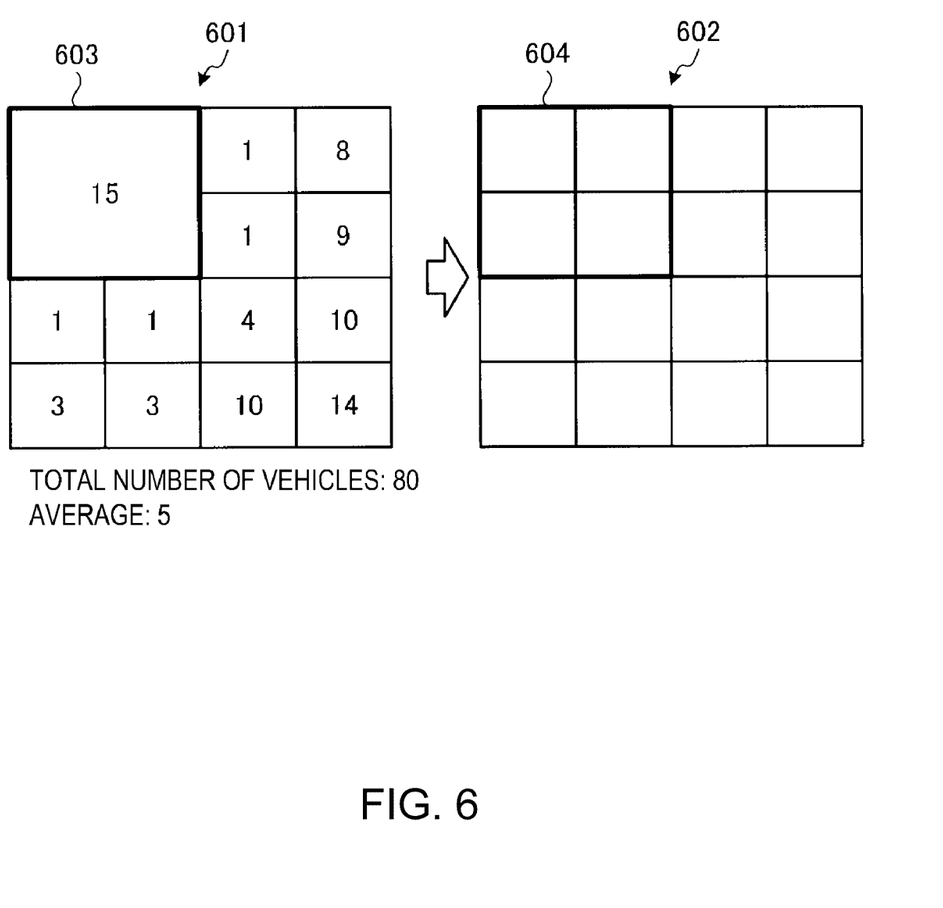
FIG. 6 is a diagram illustrating an example in which the update unit in FIG. 2 integrates a rectangular area.

Next, an example of processing when the updating unit 142 divides a plurality of rectangular areas will be described with reference to FIG. 6. Hereafter, a case where the updating unit 142 generates rectangular area definition information indicated by reference numeral 602 on the basis of a counting result of the number of vehicles in each rectangular area indicated by reference numeral 601 will be conceived as an example. It is also assumed that the updating unit 142 calculates in advance the total number "80" of vehicles in a counting target area and the average number "5" of vehicles in each rectangular range. Furthermore, a division threshold here is set to three times the average number of vehicles, that is, "15".

For example, the updating unit 142 looks at the number of vehicles in each rectangular area in order from the upper left rectangular area among the rectangular areas indicated by the reference numeral 601. When the number of vehicles in the rectangular area is equal to or greater than the division threshold "15", the updating unit 142 halves the size of the rectangular area in the longitudinal and transverse directions. Then, the updating unit 142 also compares the number of vehicles in the rectangular area, whose size is halved, with the division threshold "15", and halves the size again when the number of vehicles in the rectangular area is equal to or greater than the division threshold "15".

For example, since the number of vehicles in the rectangular area indicated by reference numeral 603 is 15, the updating unit 142 halves the size of the rectangular area in the longitudinal and transverse directions, and generates rectangular areas indicated by reference numeral 604. In other words, the updating unit 142 divides the rectangular area indicated by the reference numeral 603, and generates four rectangular areas indicated by the reference numeral 604. When the number of vehicles in the generated rectangular area is equal to or greater than the division threshold "15", the updating unit 142 halves the size again.

Note that when dividing a rectangular area as described above, the updating unit 142 may specify the size of a minimum rectangular area, and may limit the size of the divided rectangular area to be larger than the size of the minimum rectangular area.

In this way, the counting device 10 integrates rectangular areas with a small number of vehicles into a large rectangular area, so that the time required for counting the number of vehicles in each rectangular area can be reduced. Furthermore, the counting device 10 divides a rectangular area with a large number of vehicles into small rectangular areas, so that a detailed counting result can be obtained for areas where a traffic jam or the like has occurred.

Program

Programs for executing the functions of the counting device 10 described in the above embodiment can be installed in a desired information processing device (computer). For example, by causing the computer to execute the above program provided as package software or online software, the computer can function as the counting device 10. The computer described here includes a desktop or laptop personal computer, a rack-mounted type server computer, or the like. In addition, the computer includes a mobile communication terminal such as a smartphone, a mobile phone, and a personal handyphone system (PHS), as well as a personal digital assistants (PDA). Furthermore, the functions of the counting device 10 may be implemented in a cloud server.

Figure 7:
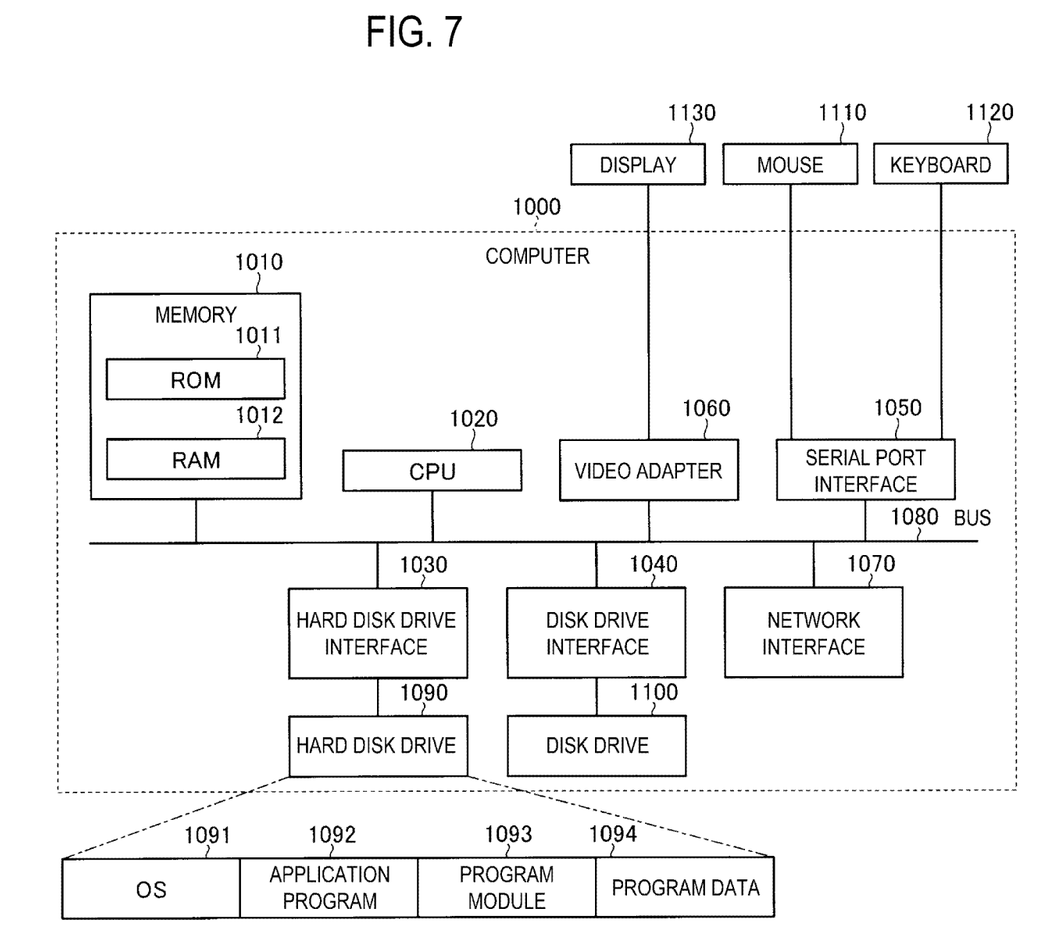
FIG. 7 is a diagram illustrating an example of a computer that executes a counting program.

An example of a computer that executes the above program (counting program) will be described with reference to FIG. 7. As illustrated in FIG. 7, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disc is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 7. The storage unit 13 described in the aforementioned embodiment is provided in, for example, the hard disk drive 1090 or the memory 1010.

The CPU 1020 reads the program module 1093 and the program data 1094, stored in the hard disk drive 1090, onto the RAM 1012 as needed, and executes each of the aforementioned procedures.

The program module 1093 and the program data 1094 related to the above counting program are not limited to being stored in the hard disk drive 1090, and for example, may be stored in a removable storage medium and read by the CPU 1020 via the disk drive 1100 or the like. Alternatively, the program module 1093 and the program data 1094 related to the program described above may be stored in another computer connected via a network such as a LAN or a wide area network (WAN), and may be read by the CPU 1020 via the network interface 1070.

REFERENCE SIGNS LIST

10 Counting device
11 Input unit
12 Output unit
13 Storage unit
14 Control unit
131 Reception data storage unit
132 Rectangular area definition information storage unit
133 Counting result storage unit
141 Counting unit
142 Updating unit

The invention claimed is:

1. A counting device comprising:
processing circuitry configured to:
store rectangular area definition information indicating positions and sizes of rectangular areas obtained by dividing an area where a number of vehicles is counted;
count the number of vehicles present in each of the rectangular areas indicated in the rectangular area definition information, every predetermined time, based on position information of each of the vehicles;
when it is determined based on a counting result of the number of vehicles present in each of the rectangular areas that there are rectangular areas where the number of vehicles is smaller than a first threshold, integrate a plurality of rectangular areas included in a scope obtained by expanding a size of the rectangular area vertically and horizontally by a factor N to generate a new rectangular area, when it is determined based on the counting result that there is a rectangular area where the number of vehicles exceeds a second threshold, divide the size of the rectangular area vertically and horizontally by a factor 1/N to generate new rectangular areas, and update the rectangular area definition information based on a position and a size of the generated new rectangular area; and
output information for displaying each rectangular area on a screen by color-coding depending on the number of vehicles existing in each rectangular area based on the counting result of the number of vehicles existing in each rectangular area.

2. The counting device according to claim 1, wherein the processing circuitry is further configured to count, when the rectangular area definition information is updated, the number of vehicles present in each of the rectangular areas based on the updated rectangular area definition information.

3. The counting device according to claim 1, wherein the first threshold is an average value of the number of vehicles present in each of the rectangular areas.

4. The counting device according to claim 1, wherein the second threshold is a value three times or more an average value of the number of vehicles present in each of the rectangular areas.

5. The counting device according to claim 1, wherein the processing circuitry is further configured to generate a rectangular area having a predetermined size when generating the new rectangular area by integrating the rectangular areas.

6. A counting method performed by a counting device, the counting method comprising:

counting, by using rectangular area definition information indicating positions and sizes of rectangular areas obtained by dividing an area where a number of vehicles is counted, the number of vehicles present in each of the rectangular areas indicated in the rectangular area definition information, every predetermined time, based on position information of each of the vehicles;

integrating, when it is determined based on a counting result of the number of vehicles present in each of the rectangular areas that there are rectangular areas where the number of vehicles is smaller than a first threshold, a plurality of rectangular areas included in a scope obtained by expanding a size of the rectangular area vertically and horizontally by a factor N to generate a new rectangular area, dividing, when it is determined based on the counting result that there is a rectangular area where the number of vehicles exceeds a second threshold the size of the rectangular area vertically and horizontally by a factor 1/N to generate new rectangular areas, and updating the rectangular area definition information based on a position and a size of the generated new rectangular area; and outputting information for displaying each rectangular area on a screen by color-coding depending on the number of vehicles existing in each rectangular area based on the counting result of the number of vehicles existing in each rectangular area.

7. A non-transitory computer-readable recording medium storing therein a counting program that causes a computer to execute a process comprising:

counting, by using rectangular area definition information indicating positions and sizes of rectangular areas obtained by dividing an area where a number of vehicles is counted, the number of vehicles present in each of the rectangular areas indicated in the rectangular area definition information, every predetermined time, based on position information of each of the vehicles;

integrating, when it is determined based on a counting result of the number of vehicles present in each of the rectangular areas that there are rectangular areas where the number of vehicles is smaller than a first threshold, a plurality of rectangular areas included in a scope obtained by expanding a size of the rectangular area vertically and horizontally by a factor N to generate a new rectangular area, dividing, when it is determined based on the counting result that there is a rectangular area where the number of vehicles exceeds a second threshold, the size of the rectangular area vertically and horizontally by a factor 1/N to generate new rectangular areas, and updating the rectangular area definition information based on a position and a size of the generated new rectangular area; and outputting information for displaying each rectangular area on a screen by color-coding depending on the number of vehicles existing in each rectangular area based on the counting result of the number of vehicles existing in each rectangular area.

* * * * *